US010346333B2

(12) United States Patent
Wood, III et al.

(10) Patent No.: US 10,346,333 B2
(45) Date of Patent: Jul. 9, 2019

(54) INTELLIGENT POWER DONGLE

(71) Applicant: Dell Products L.P., Round Rock, TX (US)

(72) Inventors: Merle J. Wood, III, Round Rock, TX (US); Wei-Cheng Yu, New Taipei (TW); Sean P. O'Neal, Austin, TX (US); Thomas E. Voor, Cedar Park, TX (US); Tsung-Cheng Liao, Taoyuan (TW); Tun-Chieh Liang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 145 days.

(21) Appl. No.: 15/093,137

(22) Filed: Apr. 7, 2016

(65) Prior Publication Data

US 2017/0293347 A1    Oct. 12, 2017

(51) Int. Cl.
    G06F 1/32     (2019.01)
    G06F 13/38    (2006.01)
    G06F 13/42    (2006.01)
    G06F 1/26     (2006.01)

(52) U.S. Cl.
    CPC .............. *G06F 13/385* (2013.01); *G06F 1/26* (2013.01); *G06F 1/32* (2013.01); *G06F 13/4282* (2013.01)

(58) Field of Classification Search
    CPC ..... G06F 1/32; G06F 1/28; G06F 1/26; G06F 1/00
    USPC ....... 713/300, 310, 321, 322, 323, 324, 330, 713/375
    See application file for complete search history.

(56) References Cited

U.S. PATENT DOCUMENTS

| 8,112,567 | B2 | 2/2012 | Lydon et al. | |
|---|---|---|---|---|
| 8,296,587 | B2 | 10/2012 | Paniagua et al. | |
| 2009/0291571 | A1* | 11/2009 | Davis | G06F 1/187 439/55 |
| 2011/0239008 | A1* | 9/2011 | Lam | G06F 13/409 713/300 |
| 2012/0068535 | A1 | 3/2012 | Homan et al. | |
| 2014/0136863 | A1 | 5/2014 | Fritchman et al. | |
| 2014/0161200 | A1 | 6/2014 | Kurkowski et al. | |

(Continued)

OTHER PUBLICATIONS

International Search Report and Written Opinion for PCT Patent Application No. PCT/US16/38536 dated Sep. 14, 2016.

*Primary Examiner* — Jaweed A Abbaszadeh
*Assistant Examiner* — Keshab R Pandey
(74) *Attorney, Agent, or Firm* — Terrile, Cannatti & Chambers; Stephen A. Terrile

(57) ABSTRACT

A system and method for performing an intelligent power dongle operation for information handling systems having a serial bus power connection such as a USB type-C power connection. In certain embodiments, the intelligent power dongle includes hardware and firmware to read a legacy adapter PSID information and convert the information to serial information such as USB Type-C baseboard management controller BMC compliant data. In certain embodiments the intelligent power dongle includes power management circuitry the allow selection and proper switching between a low voltage power mode (e.g., a 5V power mode) and a higher voltage power mode (e.g., a 19.5V power mode) depending on a device attached to the intelligent power dongle. In certain embodiments, the intelligent power dongle may be used to power low voltage devices (e.g., devices powered by 5V).

18 Claims, 7 Drawing Sheets

(56) References Cited

U.S. PATENT DOCUMENTS

| | | | | |
|---|---|---|---|---|
| 2015/0160705 A1* | 6/2015 | Chen | ......................... | H02J 1/10 |
| | | | | 713/300 |
| 2015/0346792 A1* | 12/2015 | Rathi | ...................... | G06F 1/266 |
| | | | | 713/310 |
| 2016/0064854 A1* | 3/2016 | Schooley | ........... | H01R 13/2421 |
| | | | | 439/39 |
| 2016/0231777 A1* | 8/2016 | DeCamp | ............... | G06F 1/1632 |

* cited by examiner

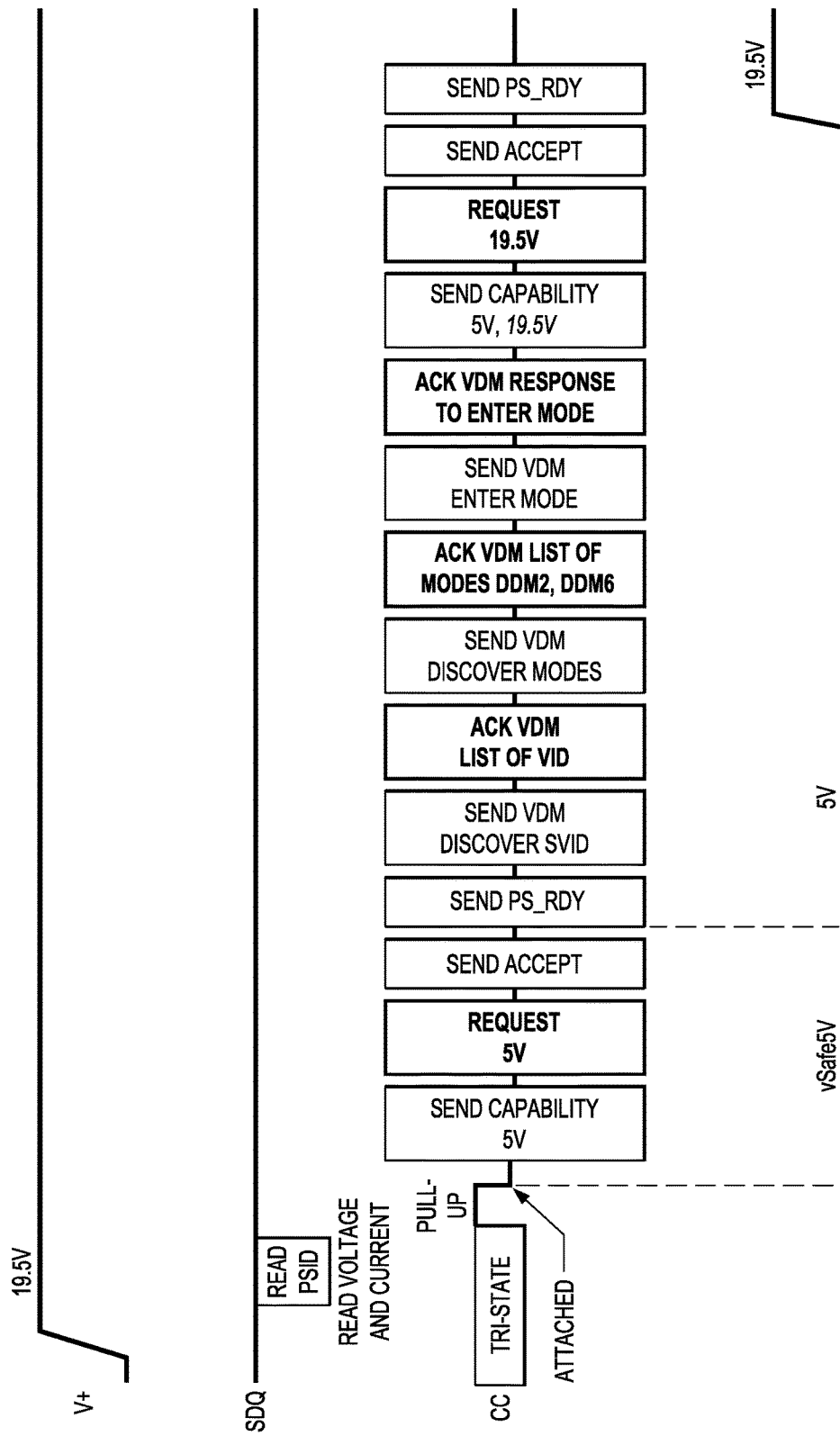

| STEP | ADAPTER | | DONGLE | | NB | VBUS |
|---|---|---|---|---|---|---|
| 1 | POWER UP | | UNATTACHED | | | 0V |
| 2 | DONGLE IS ATTACHED, OUTPUTS 5V | | ATTACHED, 5V@150mA | | | 5V |
| 3 | SENDS SOURCE CAPABILITIES, INCLUDING: 5V, 12V, 20V | → | SOURCE CAPABILITIES RECEIVED | | | 5V |
| 4 | REQUEST RECEIVED | ← | REQUEST 5V | | | 5V |
| 5 | SENDS ACCEPT | → | ACCEPT RECEIVED | | | 5V |
| 6 | SENDS PS_RDY | → | PS_RDY RECEIVED | | | 5V |
| 7 | SENDS VDM (DISCOVER SVID) | → | ACK VDM (LIST OF VID) | | | 5V |
| 8 | SENDS VDM (DISCOVER MODES) | → | ACK VDM (LIST OF MODES) | | | 5V |
| 9 | SENDS VDM (ENTER MODE) | → | ACK VDM (RESPONSE TO ENTER MODE) | | | 5V |
| 10 | UPDATE SOURCE CAPABILITIES, INCLUDING: 5V,12V,19.5V, 20V | → | SOURCE CAPABILITIES RECEIVED | | | 5V |
| 11 | REQUEST RECEIVED | ← | REQUEST 19.5V | | | 5V |
| 12 | SENDS ACCEPT | → | ACCEPT RECEIVED | | | 5V |
| 13 | SENDS PS_RDY | → | PS_RDY RECEIVED | | | 19.5V |
| 14 | | | | ← | READ WATTAGE OF PSID | 19.5V |
| 15 | | | WATTAGE DATA | → | | 19.5V |

FIG. 6

INTELLIGENT POWER DONGLE

BACKGROUND OF THE INVENTION

Field of the Invention

The present invention relates to information handling systems. More specifically, embodiments of the invention relate to an intelligent power dongle for use with an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to communicate among components of information handling systems via a serial bus. For example, serial buses which conform to various universal serial bus (USB) specifications are known. An example of the USB specification is the USB 3.1 specification (often referred to as USB Type-C).

One issue relating to information handling systems implementing a serial bus connection such as a connection which correspond to the USB 3.1 specification is obtaining power from legacy barrel type alternating current (AC) adapters. Often organizations provide power sources throughout its facility such as in meeting spaces. For many organizations these information handling system power sources largely comprise legacy barrel type AC adapters.

SUMMARY OF THE INVENTION

A system and method are disclosed for performing an intelligent power dongle operation for information handling systems having a serial bus power connection such as a USB type-C power connection. In certain embodiments, the intelligent power dongle includes hardware and firmware to read a legacy adapter PSID information and convert the information to serial information such as USB Type-C baseboard management controller BMC compliant data. In certain embodiments the intelligent power dongle includes power management circuitry the allow selection and proper switching between a low voltage power mode (e.g., a 5V power mode) and a higher voltage power mode (e.g., a 19.5V power mode) depending on a device attached to the intelligent power dongle. In certain embodiments, the intelligent power dongle may be used to power low voltage devices (e.g., devices powered by 5V). In certain embodiments the low voltage devices include cellular telephones.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 5 shows a timing sequence of the operation of an intelligent power operation using the intelligent power dongle.

FIG. 6 shows a table of an intelligent power dongle operation message sequence.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
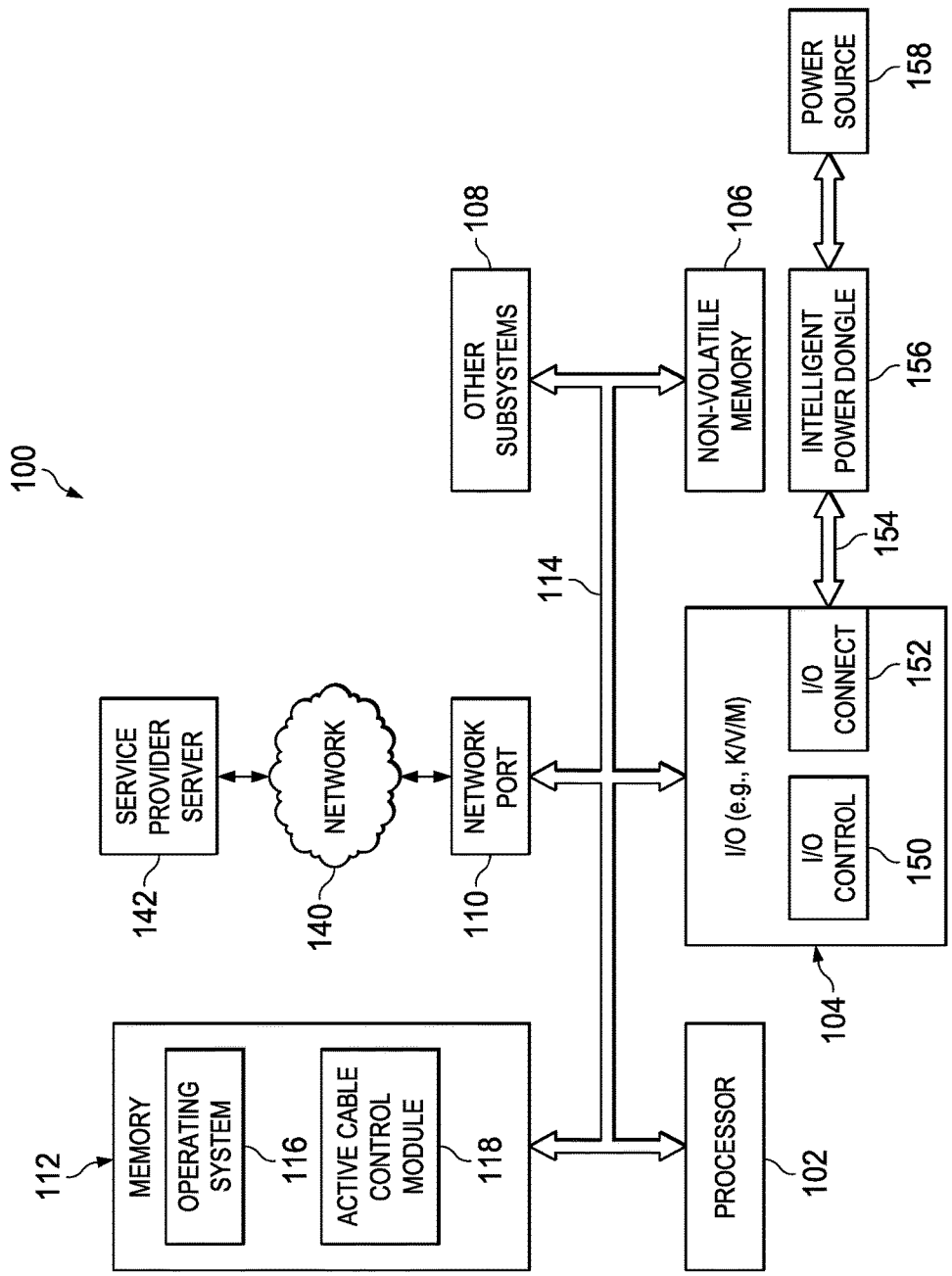
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise active cable control module 118.

Additionally, in various embodiments, I/O devices 104 of the information handling system 100 comprise an integrated I/O controller 150 as well as an integrated I/O connector 152. In certain embodiments, the integrated I/O controller 150 comprises a Thunderbolt 3 type integrated I/O controller. In certain embodiments, the integrated I/O connector comprises a USB Type-C connector. A cable 154 may be coupled to the connector 152. Additionally, in certain embodiments the cable 154 may be coupled to an intelligent power dongle 156 which in turn may be coupled to a power source 158 such as an AC power source utilizing a barrel type power connection. In certain embodiments, the cable 154 and the dongle 156 may be a single integrated unit. In certain embodiments, the intelligent power dongle 156 may be a single integrated unit with the power source 158.

Figure 2:
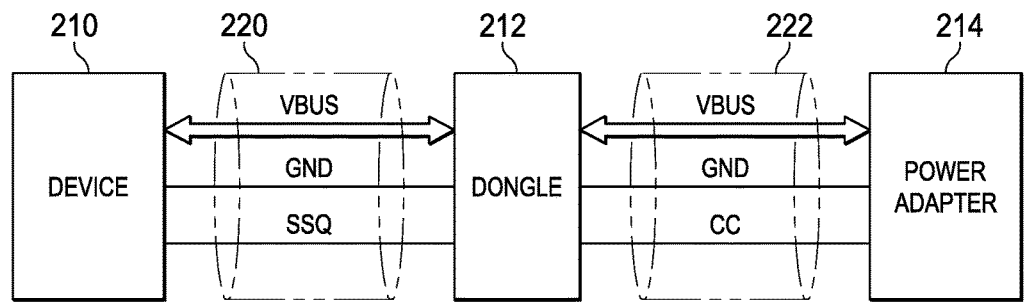
FIG. 2 shows a block diagram of an environment for performing an intelligent power dongle operation.

FIG. 2 is a block diagram of an environment 200 for performing an intelligent power dongle operation. More specifically, the environment 200 includes a device 210 which may include some or all of the elements of information handling system 100), an intelligent power dongle 212 (which may include some or all of the elements of the intelligent power dongle 156) and a power adapter 214. The environment 200 also includes a power cable 220 (which may include some or all of the elements of multi-modal cable 154) and a power cable 222 (which may include some or all of the elements of multi-modal cable 154). In certain embodiments the power cable 220 conforms to some or all of the portions of a USB Type-C cable. In certain embodiments, the power cable 220 includes a power signal path (VBUS), a ground signal path (GND) and a serial interface data I/O signal path (SDQ). In certain embodiments, the power cable 222 conforms to some or all of the portions of a barrel type power cable. In certain embodiments, the power cable 222 includes a power signal path (VBUS), a ground signal path (GND) and a configuration channel signal path (CC).

The intelligent power dongle 212 performs an intelligent power dongle operation for information handling systems having a serial bus power connection such as a USB type-C power connection. In certain embodiments, the intelligent power dongle 212 includes hardware and firmware to read a legacy adapter PSID information and convert the information to serial information such as USB Type-C baseboard management controller (BMC) compliant data. In certain embodiments the intelligent power dongle 212 includes power management circuitry the allow selection and proper switching between a low voltage power mode (e.g., a 5V power mode) and a higher voltage power mode (e.g., a 19.5V power mode) depending on a device attached to the intelligent power dongle 212. In certain embodiments, the intelligent power dongle 212 may be used to power low voltage devices (e.g., devices powered by 5V). In certain embodiments the low voltage devices include cellular telephones.

Figure 3:
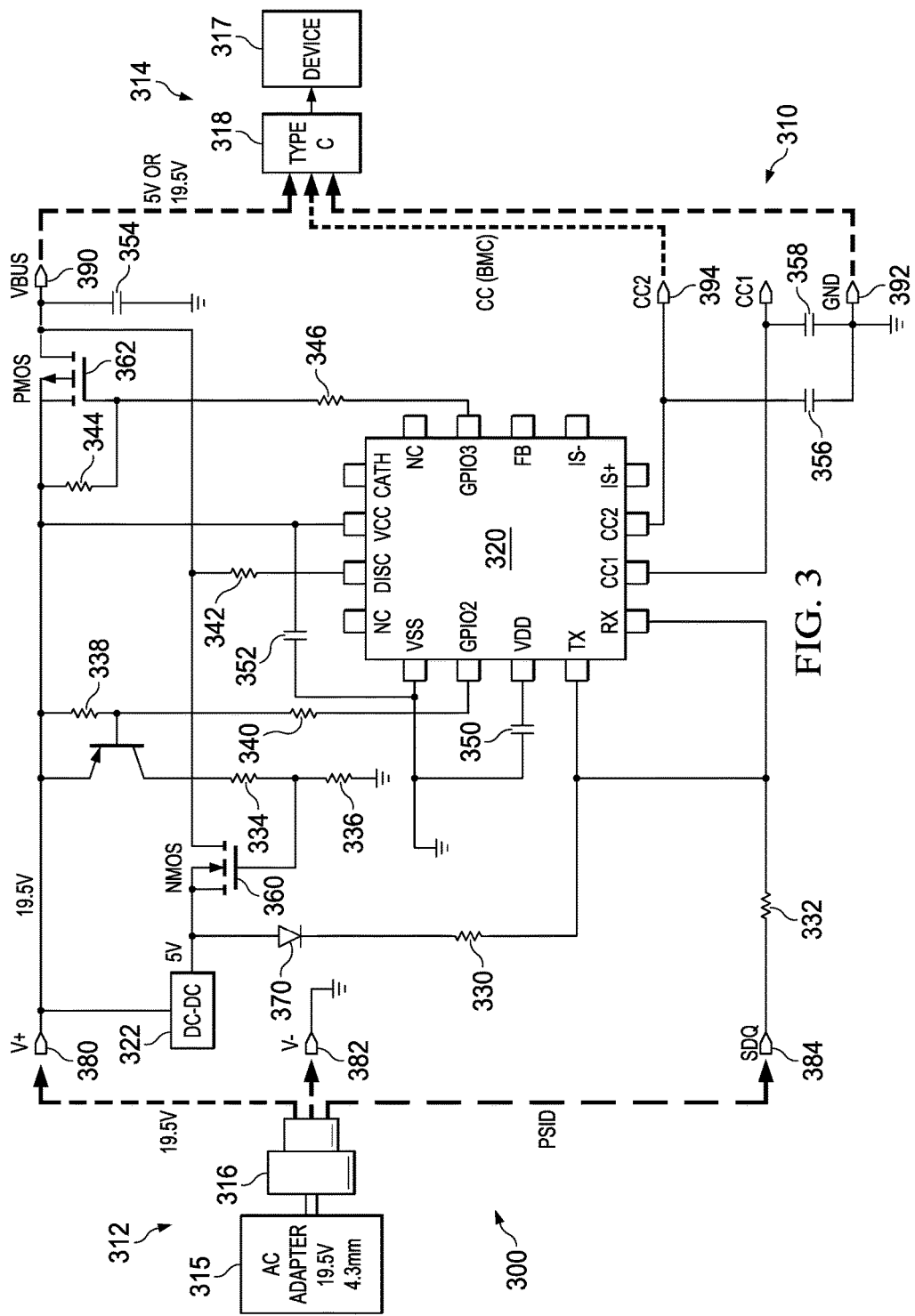
FIG. 3 shows a schematic block diagram of an intelligent power dongle.

FIG. 3 shows a schematic block diagram of an intelligent power dongle 300 (which includes some or all of the functionality of intelligent power dongle 212). The intelligent power dongle 300 includes a control portion 310, a power connection portion 312 and a device connection portion 314. The power connection portion 312 is coupled to a power adapter 315 such as an AC adapter such as a 19.5V adapter via a power connection 316 such as a barrel type power connection (e.g., a 4.3 mm barrel type connection). The device connection portion 314 is coupled to a device 317 such as an information handling system 100 via a device connector 318 such as a USB Type-C connector.

The control portion 310 includes a control circuit 320 as well as a power converter circuit 322. In certain embodiments, the control circuit 320 includes a USB power delivery (PD) controller for a dongle application. The control circuit 320 establishes communication between a power adapter and the control circuit and enables a higher voltage power capacity and relays power supply identification (PSID) information to the device connection portion for provision to an information handling system (e.g., information handling system 100) coupled to the device connection portion 314. In certain embodiments, the control circuit 320 includes a micro control unit (MCU) which identifies the power capability of the barrel type AC Adapter via its unique ID, then converts the power level to an appropriate USB Type-C power delivery (PD) voltage and power level. The control circuit 320 digitizes an indication of an appropriate power level, which the control circuit 320 then communicates to a device attached to the USBC C PD port using an industry standard protocol.

The control portion also includes a plurality of resistors 330, 332, 334, 336, 338, 340, 342, 344 and 346, a plurality of capacitors 350, 352, 354, 356 and 358, a plurality of transistors 360, 361, 362 and a diode 370. More specifically, the resistor 330 provides a pull up function for the SDQ signal. The resistor 332 provides an electro static discharge (ESD) protection function. The resistors 334 and 336 generate a $V_{GS}$ voltage of transistor 360. The resistors 338 and 340 control whether transistor 361 is on or off. The resistor 342 determines a discharge current of the control portion. The resistors 344 and 346 generate a $V_{GS}$ voltage of transistor 362. The capacitor 350 provides a bypass capacitor function for the voltage regulator. The capacitor 352 provides a bypass capacitor function for the integrated circuit power supply. The capacitor 354 provides a bypass capacitor function for the power supply output. The capacitors 356 and 358 provide an input capacitor function for the USB power delivery configuration channel receiver. The transistor 360 provides a switch function to switch the 5V supply to the output. The transistor 362 provides a switch function to switch the 19.5V supply to the output. The diode 370 provides an isolation operation to isolate the 5V power supply.

The power connection portion 312 includes a voltage plus connection 380 (V+), a voltage minus connection 382 (V−) and a serial interface data I/O connection 384 (SDQ). The device connection portion 314 includes a voltage bus connection 390 (VBUS), a ground connection 392 (GND) and a control channel connection (CC2).

In general, the intelligent power dongle performs a plurality of intelligent operations. More specifically, when the intelligent power dongle is coupled to an adapter, the intelligent dongle detects whether 19.5 V is present via the VCC signal connection and then reads the PSID information of the power adapter to obtain voltage and current capabilities of the adapter. When a device is coupled to the intelligent power dongle (e.g., via a USB Type-C connection), the intelligent power dongle provides a 5 V output to the device and transmits adapter capability to the device. After a 5 V contract is established, the intelligent power dongle transmits vendor defined message (VDM) information to the device. If the device is intelligent power compliant, then the intelligent power dongle enters a higher voltage power state (e.g., DDM2 or DDM6) and transmits the adapter capability to the device with the 19.5 V received from the adapter. In certain embodiments, DDM2 and DDM6 correspond to manufacturer defined modes. The manufacturer defined modes comprise alternate power modes that an original equipment manufacturer (OEM) can define as needed to specifically meet proprietary modes of operation. When both the source and sink recognize a manufacturer defined mode, then and only then can both the source and the sink can enter the particular manufacturer defined mode of operation. In certain embodiments, the DDM2 manufacturer mode of operation corresponds to an extended power source mode of operation which allows a source to offer supporting sink power beyond 60 W of power. In certain embodiments, the DDM6 manufacturer mode of operation corresponds to an adapter mode of operation which allows certain compatible systems to conclusively identify an attached source as a particular manufacturer AC source, as opposed to a $3^{rd}$ party AC source. If the device is not intelligent power compliant, then the intelligent power dongle remains in the 5V state.

Figure 4:
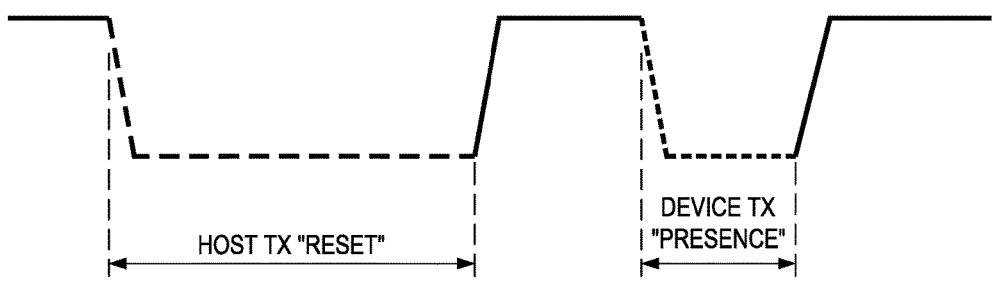
FIG. 4 shows a timing sequence of an initialization operation of the intelligent power dongle.

FIG. 4 shows a timing sequence of an initialization operation of the intelligent power dongle. More specifically, the initialization operation includes generation of reset (RESET) and presence (PRESENCE) pulses. More specifically, when initiating an initialization operation of the intelligent power dongle a host (e.g., the information handling system 100) generates and transmits a reset pulse. If the intelligent power dongle is receiving valid PSID data from a power adapter, then the intelligent power dongle responds with a presence pulse. If the intelligent power dongle is not receiving valid PSID data from a power adapter, then the intelligent power dongle does not response to the reset pulse with the presence pulse.

FIG. 5 shows a power and data timing sequence of an intelligent power operation 500 using the intelligent power dongle 300. More specifically, when starting an intelligent power dongle operation the V+ signal connection is powered to a higher voltage level (e.g., 19.5 V) provided by a power adapter. While the CC channel is pulled up due to being initially a tri state condition, a pulse is generated on the SDQ connection indicating a read PSID operation (i.e., instructing the control circuit 210 to read a voltage and current value of a device. When the CC channel indicates that a device is attached, the VBUS signal is powered to a safe low voltage level (e.g., vSafe5V). Next, the CC channel transmits a send capability 5V indication generated by the adapter. Next, the CC channel transmits an indication of a request for 5V generated by the intelligent power dongle. Next, the CC channel transmits a send and accept indication generated by the adapter. Next, the CC channel transmits a power supply ready (PS_RDY) signal generated by the adapter. Next, the CC channel transmits a VDM signal and a discover standard/vendor identification (SVID) signal generated by the adapter. Next, the CC channel transmits a VDM acknowledgement (ACK VDM) signal and a list of voltage identifiers (VIDs) generated by the intelligent power dongle. Next, the CC channel transmits available VDM discover modes generated by the adapter. Next, the CC channel transmits an acknowledge VDM signal along with a list of available VDM modes including at least one of a DDM2 mode and a DDM6 mode generated by the intelligent power dongle. Next, the CC channel transmits a VDM enter mode generated by the adapter. Next, the CC channel transmits an ACK VDM response to enter mode generated by the intelligent power dongle. Next, the CC channel transmits a device capability information indicating whether the device is capable of 5V operation and/or 19.5 V operation generated by the adapter. If the device is capable of 19.5 V operation, the CC channel transmits a request 19.5 V indication generated by the intelligent power dongle. Next, the CC channel transmits a device 19.5V acceptance indication generated by the adapter. Upon receipt of the device 19.5 V acceptance indication, the CC channel transmits a power supply ready (PS_RDY) indication generated by the adapter and the VBUS channel voltage is raised to 19.5 volts.

FIG. 6 shows a table of an intelligent power dongle operation message sequence. More specifically, at step 1 the adapter is powered up, the dongle is unattached and the VBUS from the power adapter is set to 0V. Next at step 2, when a dongle is attached to the adapter, the adapter voltage is raised to 5V and the dongle provides 5 Volts (e.g., 5V at 150 mA) via the VBUS channel. Next at step 3 the adapter sends source capabilities of the adapter which are received by the dongle. In certain embodiments the source capabilities include 5V, 12V and/or 20V source capabilities. Next at step 4 the dongle requests 5V from the adapter which receives the request. Next at step 5, the adapter sends an accept indication which is received by the dongle. Next at step 6 the adapter sends a power supply ready (PS_RDY) indication which is received by the dongle. Next at step 7, the adapter sends a VDM discover indication (requesting a discover standard or vendor identification (SVID) operation) to which the dongle provides an acknowledge VDM indication (ACK VDM) which includes a list of vendor identifiers (VIDs). Next at step 8, the adapter sends a VDM discover indication (requesting a discover modes operation) to which the dongle provides an acknowledge VDM indication (ACK VDM) which includes a list of modes. Next at step 9, the adapter sends a VDM discover indication (indicating for the dongle to enter a particular mode of operation) to which the dongle provides an acknowledge VDM indication (ACK VDM) which includes a response to the enter mode. Next at step 10 the adapter provides updated source capabilities which are received by the dongle. In certain embodiments, the updated source capabilities include 5V, 12V, 19.5 and/or 20V source capabilities. Next at step 11, the dongle generates a higher voltage request which is received by the adapter. In certain embodiments, the higher voltage request is a request for 19.5V. Next at step 12 the adapter sends and accept indication which is received by the dongle. Next at step 13 the adapter sends a PS_RDY signal which is received by the dongle at which time the dongle increases the voltage on the VBUS channel to 19.5 volts. Next at step 14, the device (e.g., a notebook type information handling system) reads a wattage indication from a PSID indicator provided by the adapter to determine whether the adapter supports the wattage required by the device. Next at step 15 the dongle provides the wattage data to the device.

Figure 7:
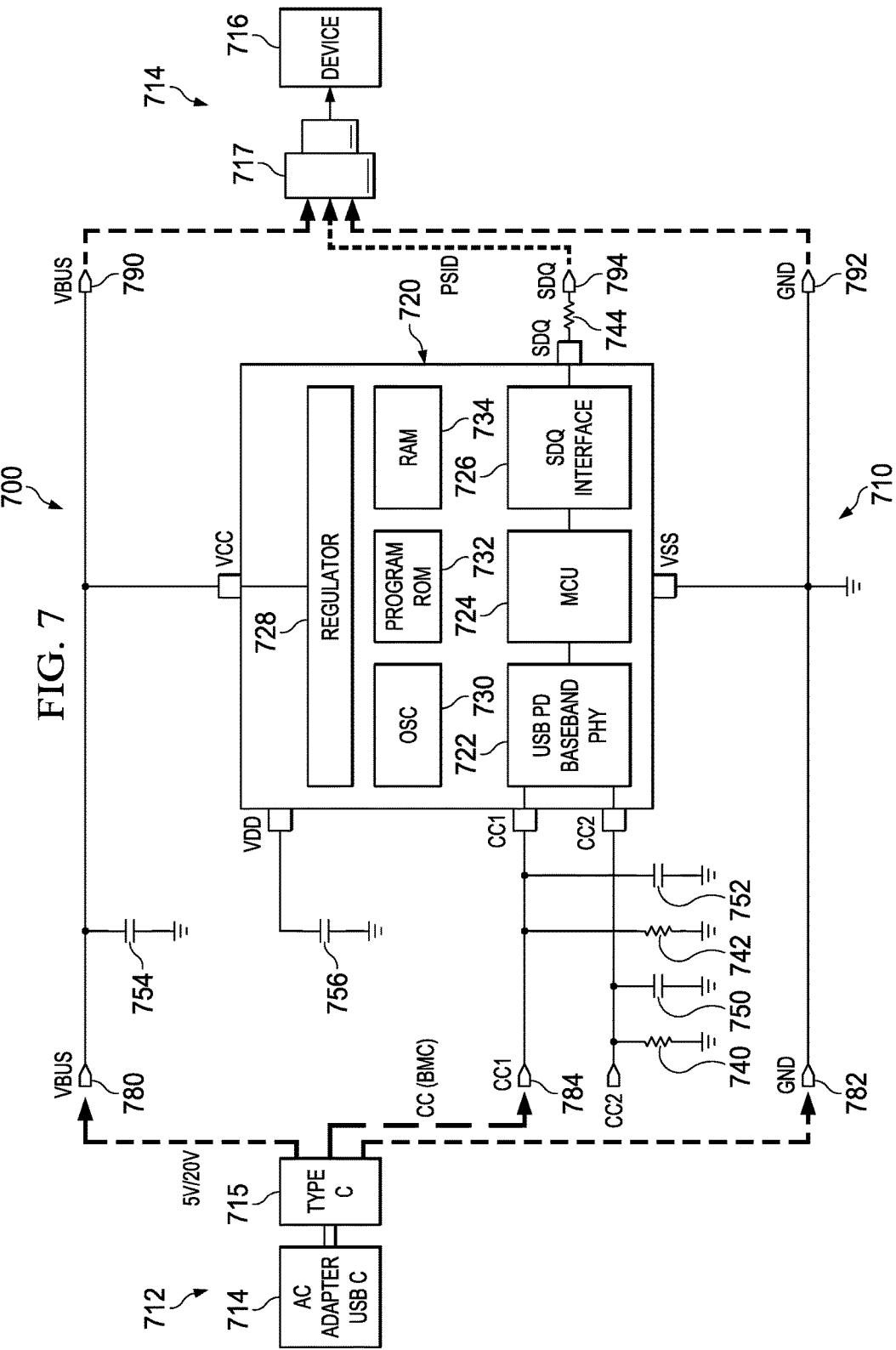
FIG. 7 shows a schematic block diagram of another intelligent power dongle.

FIG. 7 shows a schematic block diagram of an intelligent power dongle 700 (which includes some or all of the functionality of intelligent power dongle 212). The intelligent power dongle 700 includes a control portion 710, a power connection portion 712 and a device connection portion 714. The power connection portion 712 is coupled to a power adapter 714 such as an USB Type-C power adapter via a power connection 715 such as a USB Type-C connector. The device connection portion 714 is coupled to a a device 716 via a power connection 717 such as a barrel type power connection (e.g., a 4.3 mm barrel type connection).

The control portion 710 includes a control circuit 720. In certain embodiments, the control circuit 720 includes a USB power delivery (PD) controller for a dongle application. The control circuit 720 establishes communication between a power adapter and the control circuit and enables a higher voltage power capacity and relays power supply identification information (PSID) to the device connection portion for provision to an information handling system (e.g., information handling system 100) coupled to the device connection portion 714. In certain embodiments, the control circuit 720 includes an MCU, which identifies the power capability of the USB Type-C PD Adapter via a USB Type-C PD protocol. The control circuit 720 then converts this power capability to an appropriate manufacturer specific identifier for systems compatible with the single wire PSID identifier.

In certain embodiments, the control circuit 720 includes a USB PD baseband PHY circuit 722, a micro control unit (MCU) circuit 724 and a serial interface data I/O (SDQ) circuit 726. In certain embodiments, the control circuit further includes a regulator circuit 728, an oscillator circuit 730, a program read only memory (ROM) circuit 732 and a read only memory (RAM) portion 734. The USB C PD baseband PHY circuit 722 is include circuitry for converting Bi-phase Mark Encoded (BCM) communication protocol carried on CC Wires to binary communication for use by the MCU circuit 724. The SDQ circuit 724 include firmware that converts an MCU binary (which may be clocked) data stream to a single wire communication protocol such as a PSID type communication protocol (which may be clockless). The regulator circuit 728 include circuitry for providing a voltage regulator function for converting high voltages (e.g., 20V) to MCU tolerant low voltages to power the MCU circuit 724 (e.g., 3.3V). The oscillator circuit 730 include circuitry for generating an MCU clock frequency. The ROM circuit 732 includes MCU USB C PD compliant programming as necessary to communicate with an attached USB Type-C PD device. The RAM circuit 720 stores information such as look up tables for converting from USB Type-C PD to PSID.

The control portion also includes a plurality of resistors 740, 742 and 744 and a plurality of capacitors 750, 752, 754 and 756. More specifically, capacitors 750, 752, 754, 756 provide bias voltage decoupling customary with most power circuits. Resistors 740, and 742 are 5.1 K ohm used to identify the dongle 700 is an upstream facing port (UFP) and to inform the USB Type-C PD adapter 716 to supply 5V to dongle 700.

The power connection portion 712 includes a voltage bus connection 780 (VBUS), a ground connection 782 (GND) and a control channel connection 784 (CC1). The device connection portion 714 includes a voltage connection 790 (VBUS), a ground connection 792 (GND) and a serial interface data I/O connection 794 (SDQ)

Figure 8:
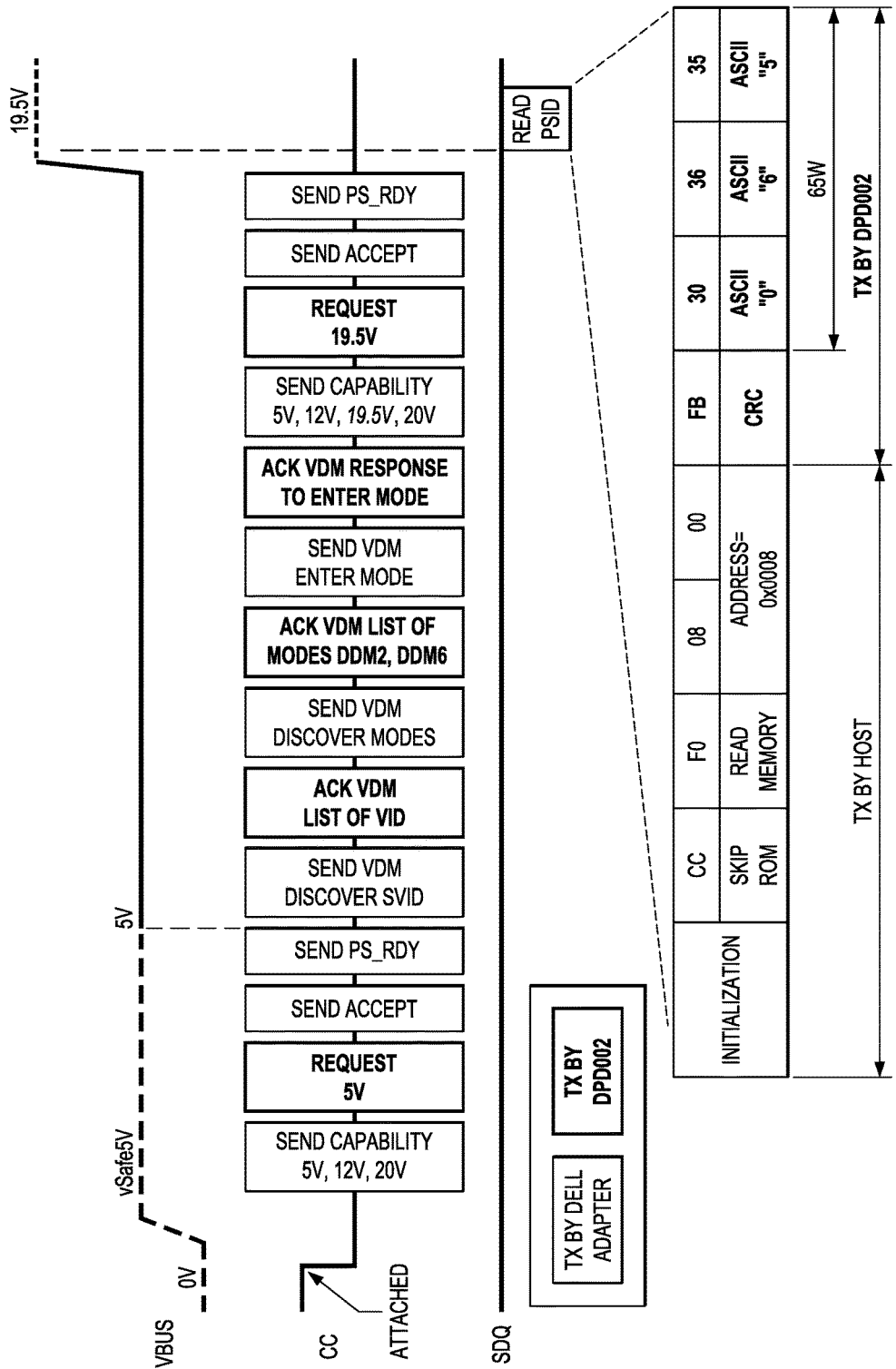
FIG. 8 shows a timing sequence of the operation of an intelligent power operation using the intelligent power dongle.

FIG. 8 shows a timing sequence of the operation of an intelligent power operation 800 using the intelligent power dongle 700. More specifically, the power and data sequence of the intelligent power operation 800 on the VBUS communication channel and the CC communication channel are similar to that of the intelligent power operation 400. However, the intelligent power operation 800 also includes transmission of a Read PSID indication via the SDQ communication channel. In certain embodiments, the Read PSID indication includes a host (i.e., power adapter) transmission portion and an intelligent power dongle transmission portion. In certain embodiments, the Read PSID indication provides information regarding the type of device to be identified, the power level of device, and the generation of device. For example, a device can be identified as a Dongle as opposed to a dedicated AC Adapter. The host transmission portion includes an initialization communication, a CC communication (indicating to skip reading of the ROM) an F0 communication (indicating to read the memory), an 08 communication and a 00 communication (indicating the read address is 0x0008). The intelligent power dongle transmission portion includes an FB communication (indicating a cyclic redundancy check value (CRC)), a 30 communication (indicating an ASCII 0), a 36 communication (indicating an ASCII 6) and a 35 communication (indicating an ASCII 5).

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing an intelligent power operation, comprising:
   reading power adapter information, the power adapter information comprising power adapter capability information, the power adapter capability information being read via a configuration channel (CC) signal path;
   converting the power adapter capability information to serial power information, the converting the power adapter capability information being performed via an intelligent power dongle, the intelligent power dongle comprising a control portion, a power connection portion and a device connection portion, the control portion comprising a control circuit, the control circuit comprising a micro control unit (MCU) and a serial interface data I/O (SDQ) circuit, the SDQ circuit converting a clocked binary data stream generated by the MCU to a single wire communication protocol;
   providing the serial power information to a device, the serial power information being provided to the device via a serial interface data input/output (I/O) (SDQ) signal path;
   determining whether the device is capable of operating at a higher voltage mode of operation based upon a response from the device to the serial power information; and,
   providing the device with a higher voltage when the device is capable of operating at the higher voltage mode of operation.

2. The method of claim 1, further comprising:
   the providing the serial power information and the providing the device with the higher voltage being performed via the intelligent power dongle.

3. The method of claim 2, wherein:
   the device connection portion of the intelligent power dongle comprises to a USB Type-C connector.

4. The method of claim 3, wherein:
   the power connection portion of the intelligent power dongle comprises a barrel type power adapter connector.

5. The method of claim 1, wherein:
   the serial power information comprises USB Type-C baseboard management controller BMC compliant data.

6. The method of claim 1, wherein:
   the power adapter capability information comprises adapter power supply identification (PSID) information.

7. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
      reading power adapter information, the power adapter information comprising power adapter capability information, the power adapter capability information being read via a configuration channel (CC) signal path;
      converting the power adapter capability information to serial power information, the converting the power adapter capability information being performed via an intelligent power dongle, the intelligent power dongle comprising a control portion, a power connection portion and a device connection portion, the control portion comprising a control circuit, the control circuit comprising a micro control unit (MCU) and a serial interface data I/O (SDQ) circuit, the SDQ circuit converting a clocked binary data stream generated by the MCU to a single wire communication protocol;
      providing the serial power information to a device, the serial power information being provided to the device via a serial interface data input/output (I/O) (SDQ) signal path;
      determining whether the device is capable of operating at a higher voltage mode of operation based upon a response from the device to the serial power information; and,
      providing the device with a higher voltage when the device is capable of operating at the higher voltage mode of operation.

8. The system of claim 7, wherein:
   the providing the serial power information and the providing the device with the higher voltage is performed via the intelligent power dongle.

9. The system of claim 8, wherein:
   the device connection portion of the intelligent power dongle comprises to a USB Type-C connector.

10. The system of claim 9, wherein:
    the power connection portion of the intelligent power dongle comprises a barrel type power adapter connector.

11. The system of claim 7, wherein:
    the serial power information comprises USB Type-C baseboard management controller BMC compliant data.

12. The system of claim 7, wherein:

the power adapter capability information comprises adapter power supply identification (PSID) information.

13. An environment for performing an intelligent power dongle operation comprising:

an intelligent power dongle;

a power adapter coupled to the intelligent power dongle;

a device coupled to the intelligent power dongle;

the intelligent power dongle being configured for:

reading power adapter information from the power adapter, the power adapter information comprising power adapter capability information, the power adapter capability information being read via a configuration channel (CC) signal path;

converting the power adapter capability information to serial power information, the intelligent power dongle comprising a control portion, a power connection portion and a device connection portion, the control portion comprising a control circuit, the control circuit comprising a micro control unit (MCU) and a serial interface data I/O (SDQ) circuit, the SDQ circuit converting a clocked binary data stream generated by the MCU to a single wire communication protocol;

providing the serial power information to the device, the serial power information being provided to the device via a serial interface data input/output (I/O) (SDQ) signal path;

determining whether the device is capable of operating at a higher voltage mode of operation based upon a response from the device to the serial power information; and, providing the device with a higher voltage when the device is capable of operating at the higher voltage mode of operation.

14. The environment of claim 13, wherein:

the control circuit includes power management circuitry, the power management circuitry allowing selection and proper switching between a low voltage power mode and a higher voltage power mode depending on the device coupled to the intelligent power dongle.

15. The environment of claim 13, wherein:

the device connection portion of the intelligent power dongle comprises to a USB Type-C connector.

16. The environment of claim 13, wherein:

the power connection portion of the intelligent power dongle comprises a barrel type power adapter connector.

17. The non-transitory, computer-readable storage medium of claim 13, wherein:

the serial power information comprises USB Type-C baseboard management controller BMC compliant data.

18. The non-transitory, computer-readable storage medium of claim 13, wherein:

the power adapter capability information comprises adapter power supply identification (PSID) information.

* * * * *